US010186989B2

(12) United States Patent
Noto

(10) Patent No.: US 10,186,989 B2
(45) Date of Patent: Jan. 22, 2019

(54) VIBRATION WAVE MOTOR

(71) Applicant: CANON KABUSHIKI KAISHA, Tokyo (JP)

(72) Inventor: Goro Noto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 411 days.

(21) Appl. No.: 15/165,156

(22) Filed: May 26, 2016

(65) Prior Publication Data

US 2016/0352255 A1    Dec. 1, 2016

(30) Foreign Application Priority Data

May 29, 2015   (JP) .................................. 2015-109280

(51) Int. Cl.
*H02N 2/00* (2006.01)
*H01L 41/09* (2006.01)
*H02N 2/02* (2006.01)
*G02B 7/08* (2006.01)

(52) U.S. Cl.
CPC .............. *H02N 2/026* (2013.01); *G02B 7/08* (2013.01); *H02N 2/0015* (2013.01); *H02N 2/0055* (2013.01)

(58) Field of Classification Search
CPC .... H02N 2/026; H02N 2/0015; H02N 2/0055; G02B 7/08

USPC ........................ 310/323.01–323.21, 328, 348
See application file for complete search history.

(56) References Cited

U.S. PATENT DOCUMENTS

2003/0202114 A1\* 10/2003 Takizawa ............... G03B 17/02
                                                       348/335

FOREIGN PATENT DOCUMENTS

JP   2011-254587 A   12/2011
JP   2013-158151 A    8/2013

\* cited by examiner

*Primary Examiner* — Thomas Dougherty
(74) *Attorney, Agent, or Firm* — Cowan, Liebowitz & Latman, P.C.

(57) ABSTRACT

Provided is a vibration wave motor including a holding structure that does not inhibit vibration of the entire vibrator. The vibration wave motor includes: a vibrator that generates an elliptic motion; a holding means that holds the vibrator; and a driven body driven by the vibrator, wherein the holding means includes a first abutting portion and a second abutting portion abutting the vibrator, the vibrator includes a first displacement portion at a part abutting the first abutting portion and includes a second displacement portion at a part abutting the second abutting portion, a displacement of the first displacement portion is smaller than a displacement of the second displacement portion, and an area of the first abutting portion of the holding means is greater than an area of the second abutting portion.

9 Claims, 6 Drawing Sheets

VIBRATION WAVE MOTOR

BACKGROUND OF THE INVENTION

Field of the Invention

The present invention relates to a vibration wave motor including a vibrator and a friction member in frictional contact with the vibrator, wherein the vibrator and the friction member are displaced relative to each other.

Description of the Related Art

Conventionally, various proposals are made in relation to an ultrasonic motor that generates an elliptic motion at a predetermined place of a vibrator to relatively move the vibrator and a friction member in frictional contact with the vibrator and in relation to an imaging apparatus including the ultrasonic motor as a driving source of a mechanism unit and a lens of a camera. The ultrasonic motor is disclosed in Japanese Patent Application Laid-Open No. 2013-158151. The vibrator included in the ultrasonic motor includes a piezoelectric element, and AC voltages of two different phases can be applied to the piezoelectric element. The voltages are applied to the piezoelectric element to excite an elliptic vibration wave in a projection and the like provided on a surface of the vibrator. The projection of the vibrator is brought into contact with a friction member by pressure to generate driving force, and the vibrator slides on the surface of the friction member at desired driving force. The vibrator is provided with a support portion (connection portion) and includes a holding member for holding and fixing the vibrator at the support portion. A vibrator including a piezoelectric element is disclosed in Japanese Patent Application Laid-Open No. 2011-254587 for example. Vibration displacement of an extending portion of the vibrator is greater than that of a fixing portion, and vibrational energy is stored in the extending portion. Concentration of the vibrational energy on the fixing portion is avoided.

When the holding portion of the vibrator is held and fixed by the holding member, a holding structure for preventing inhibition of the vibration of the vibrator is necessary in order to efficiently generate desired elliptic motion in the projection and the like of the vibrator. More specifically, when the elliptic motion is generated at a desired place, the vibration is not generated in the holding portion of the vibrator, but the vibration is generated around the holding portion. Therefore, it is important to design a holding structure that reduces the vibration in the holding portion of the vibrator as much as possible. However, if an abutting range of the holding member and the holding portion of the vibrator is enlarged to surely hold the vibrator, the vibration of the vibrator is inhibited. The desired elliptic motion is not generated in the vibrator, and a malfunction occurs in the ultrasonic motor. The conventional technique has a problem that the abutting range of the holding member and the holding portion of the vibrator is not specified, and the vibration of the vibrator is inhibited.

SUMMARY OF THE INVENTION

The present invention has been made in view of the problem, and an object of the present invention is to provide a vibration wave motor (ultrasonic motor) including a holding structure that does not inhibit vibration of the entire vibrator.

To attain the object, the present invention provides a vibration wave motor including: a vibrator that generates an elliptic motion; a holding means that holds the vibrator; and a driven body driven by the vibrator, wherein the holding means includes a first abutting portion and a second abutting portion abutting the vibrator, the vibrator includes a first displacement portion at a part abutting the first abutting portion and comprises a second displacement portion at a part abutting the second abutting portion, a displacement of the first displacement portion is smaller than a displacement of the second displacement portion, and an area of the first abutting portion of the holding means is greater than an area of the second abutting portion.

According to the present invention, a vibration wave motor including a holding structure that does not inhibit vibration of the entire vibrator can be provided.

Further features of the present invention will become apparent from the following description of exemplary embodiments with reference to the attached drawings.

BRIEF DESCRIPTION OF THE DRAWINGS

FIG. 6A is a plan view of a state in which the vibrator 10 and the holding member 11 are integrated by adhesion or the like.

FIG. 7 is a side view of a state in which the vibrator 10 and the holding member 11 are integrated by adhesion or the like.

DESCRIPTION OF THE EMBODIMENTS

Preferred embodiments of the present invention will now be described in detail in accordance with the accompanying drawings.

Embodiment

A vibration wave motor of the present invention will now be described with reference to FIGS. 1 to 7. An AF lens 120 included in an imaging apparatus not illustrated that includes a vibrator unit 121 as a driving source and that is driven in an optical axis OL direction will also be described with reference to FIGS. 1 to 4. In the present specification, a direction (optical axis OL direction) in which a vibrator 10 described later is moved by an elliptic motion generated in the vibrator 10 will be described as an X direction. A pressurizing direction of an urging member 13 described later will be described as a Z direction. A direction perpendicular to the X direction and the Z direction will be described as a Y direction.

Figure 1A:
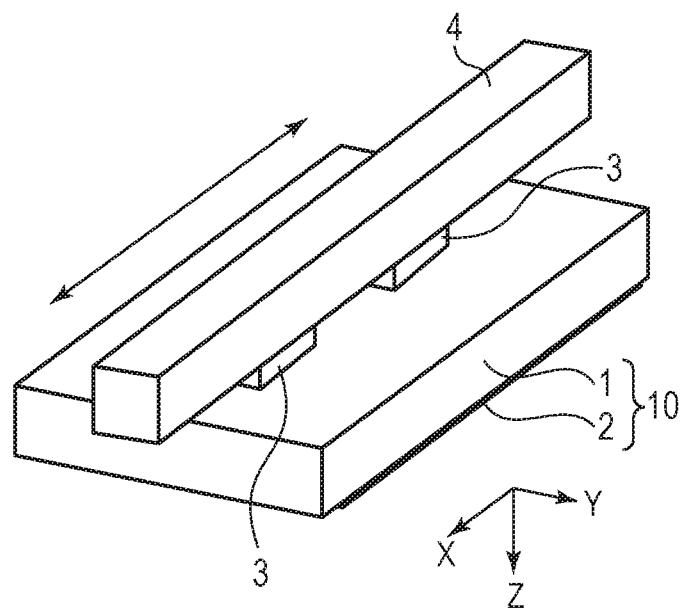
FIG. 1A is a perspective view illustrating a configuration of a vibration wave motor.
Figure 2A:
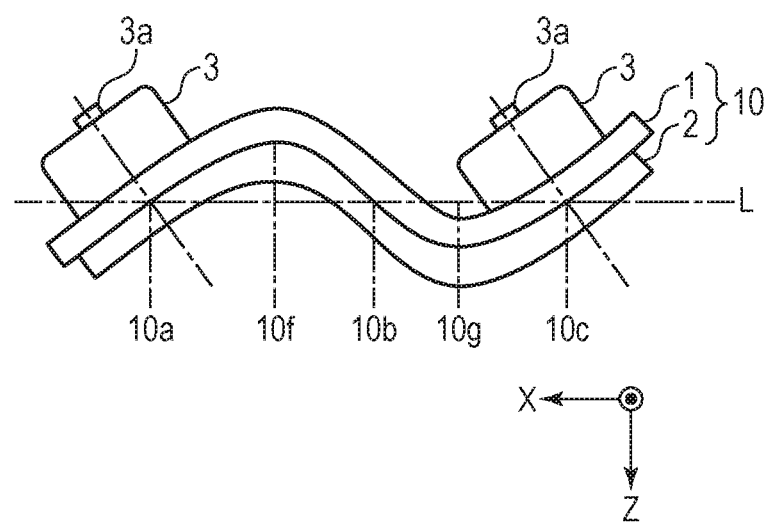
FIG. 2A is a diagram illustrating positions of antinodes and nodes of vibration generated in a secondary bending vibration mode in an X direction in a vibrator 10.
Figure 2B:
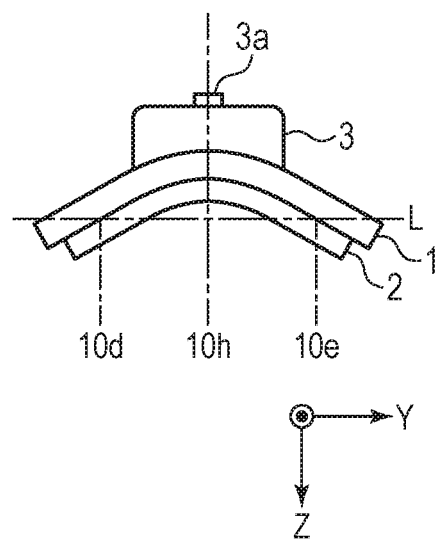
FIG. 2B is a diagram illustrating positions of an antinode and nodes of vibration generated in a primary bending vibration mode in a Y direction in the vibrator 10.

As illustrated in FIG. 1A, the vibrator 10 includes: an elastic body 1 made of metal for example; and a piezoelectric element 2 connected to a bottom surface (back side) of the elastic body 1 by adhesion or the like. A plurality of convex portions 3 is provided on an upper side of the elastic body 1. As illustrated in FIGS. 2A and 2B, the convex portion 3 is provided with a contact portion 3a that comes in contact with a slider 4 that is a driven member. The vibrator 10 is equivalent to a vibrator of the present invention, and the AF lens 120 is equivalent to a driven body of the present invention.

Figure 1B:
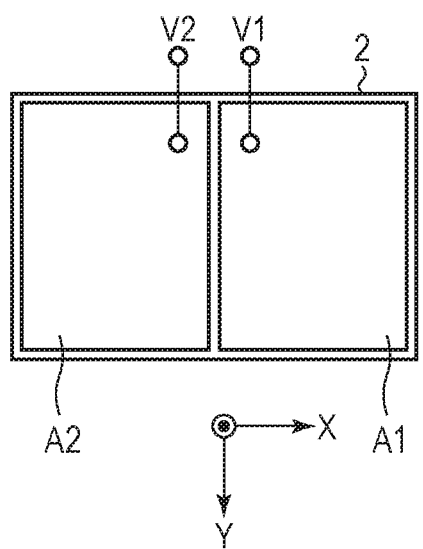
FIG. 1B is a diagram illustrating a configuration of an electrode of a piezoelectric element 2.

As illustrated in FIG. 1B, polarization processing is applied to the piezoelectric element 2, and the piezoelectric element 2 includes two electrodes A1 and A2. When AC voltages V1 and V2 described later are applied to the two electrodes A1 and A2, vibrations in two modes are generated. The two vibration modes will be described with reference to FIGS. 2A and 2B.

When the AC voltages V1 and V2 of opposite phases are applied to the two electrodes A1 and A2 of the piezoelectric element 2, a secondary bending vibration mode in the X direction is excited in the vibrator 10. FIG. 2A illustrates positions of antinodes and nodes generated in the secondary bending vibration mode in the X direction. Positions 10a, 10b and 10c indicate nodes in the secondary bending vibration mode. Positions 10f and 10g indicate antinodes in the secondary bending vibration mode. At the positions of nodes 10a, 10b and 10c, the vibration in the Z direction in the secondary bending vibration mode is significantly small. The contact portions 3a provided on the convex portions 3 are located at the positions of nodes 10a and 10c. Therefore, the contact portions 3a barely vibrate in the Z direction, but the contact portions 3a vibrate in the X direction. As a result, when the secondary bending vibration mode in the X direction is excited, vibration in the X direction is generated in the contact portions 3a, that is, the vibrator 10. The mode in which the contact portions 3a vibrate only in the X direction will be defined as an advancing mode.

A primary bending vibration mode will be described. When the AC voltages V1 and V2 of a same phase are applied to the two electrodes A1 and A2 of the piezoelectric element 2, the primary bending vibration mode in the Y direction is excited in the vibrator 10. FIG. 2B illustrates positions of an antinode and nodes generated in the primary bending vibration mode in the Y direction. Positions 10d and 10e indicate nodes in the primary bending vibration mode. A position 10h indicates an antinode in the primary bending vibration mode. At the positions of nodes 10d and 10e, the vibration in the Z direction in the primary bending vibration mode is significantly small. The contact portion 3a provided on the convex portion 3 is located at the position of antinode 10h, and the vibration in the Z direction is large. Therefore, when the primary bending vibration mode in the Y direction is excited, the vibration in the Z direction is generated in the contact portion 3a, that is, the vibrator 10. The mode in which the contact portion 3a vibrates only in the Z direction will be defined as a raising mode.

Figure 3:
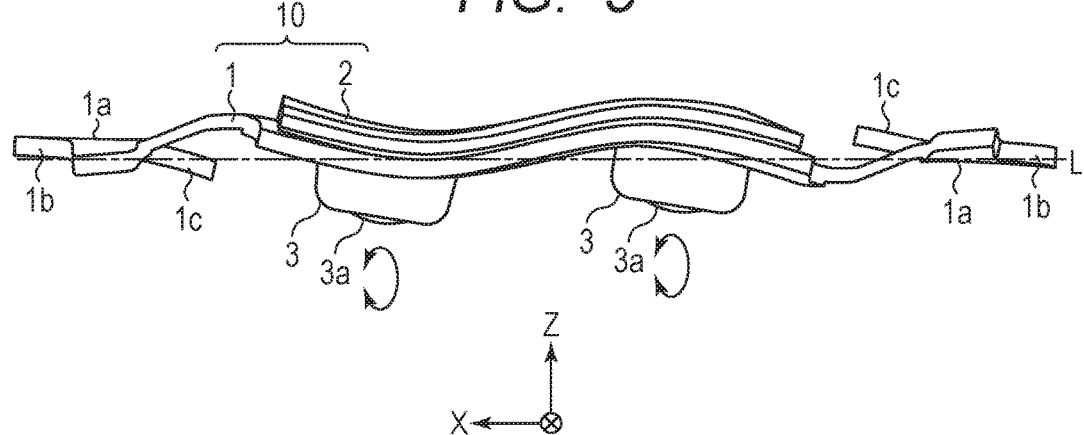
FIG. 3 is a diagram illustrating a state in which elliptic motion is excited in contact portions 3a when the primary bending vibration and the secondary bending vibration are combined in the vibrator 10.
Figure 4:
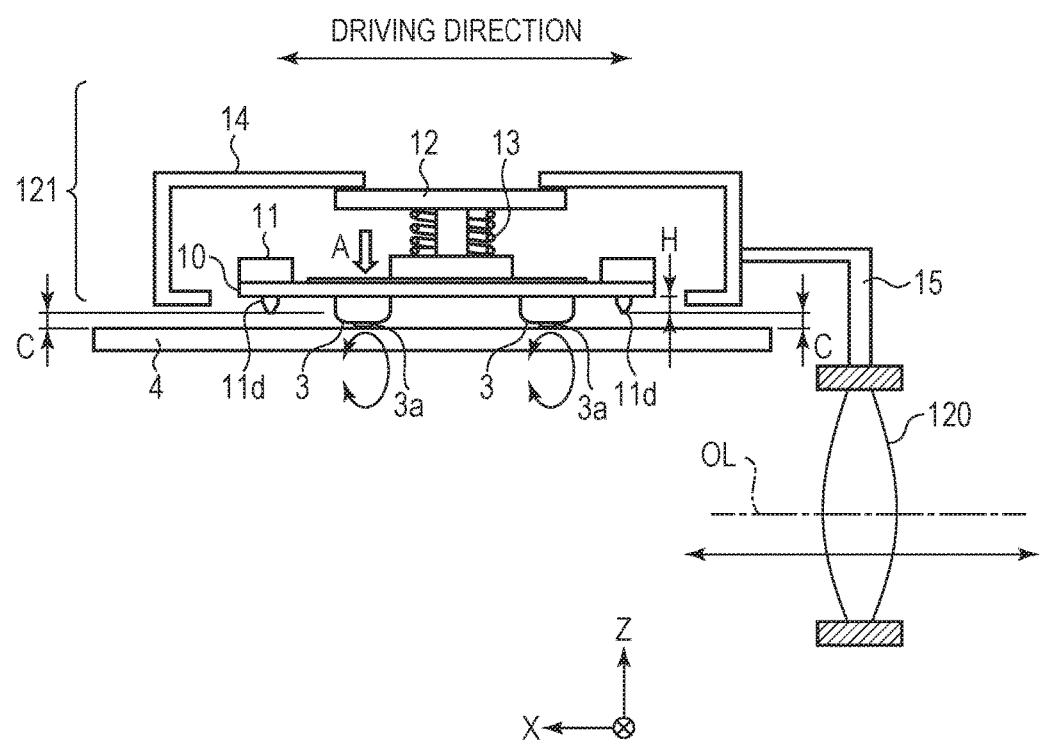
FIG. 4 is a diagram illustrating a connection state of a vibrator unit 121 and an AF lens 120.

The primary bending vibration and the secondary bending vibration are combined, and elliptic motion is excited in the contact portions 3a as illustrated in FIG. 3. The contact portions 3a with the excited elliptic motions is brought into contact with the slider 4 by pressure as illustrated in FIG. 4, and the vibrator 10 is driven in one direction (X direction in FIG. 4) relative to the slider 4.

The frequency of the AC voltage applied to the piezoelectric element 2 can be changed to change the size of the ellipse while holding the elliptic ratio of the elliptic motion. The size of the ellipse of the elliptic motion is increased by bringing the frequency of the AC voltage applied to the piezoelectric element 2 close to a resonant frequency (fr) of the vibrator 10, and the driving speed of the vibrator 10 is increased accordingly. Conversely, the size of the ellipse of the elliptic motion is reduced by distancing the frequency of the AC voltage applied to the piezoelectric element 2 from the resonant frequency of the vibrator 10, and the driving speed of the vibrator 10 is reduced accordingly. Note that the vibration for generating the elliptic motion may be vibration with the oscillation frequency in an ultrasonic range (ultrasonic vibration).

Furthermore, the phases of the AC voltages V1 and V2 applied to the electrodes A1 and A2 provided on the piezoelectric element 2 can be changed to change the elliptic ratio of the elliptic motion of the contact portion 3a. More specifically, when the phase difference is 0 degrees, the AC voltages V1 and V2 of the same phase are applied to the two electrodes A1 and A2 of the piezoelectric element 2, and the vibration in the raising mode is excited as described above. When the phase difference is 180 degrees, the AC voltages V1 and V2 with opposite phases are applied to the two electrodes A1 and A2 of the piezoelectric element 2, and the vibration in the advancing mode is excited as described above. When the phase difference is between 0 and 180 degrees, the ratio of the sizes of the amplitude in the Z direction that is the raising mode and the amplitude in the X direction that is the advancing mode changes according to the size of the phase difference. As a result, an elliptic motion with an elliptic ratio according to the set phase difference is excited in the contact portion 3a.

As illustrated in FIG. 3, a reference position L is a position of the vibrator 10 without the elliptic motion of the contact portions 3a of the vibrator 10, and holding portions 1a (described in detail later) of the vibrator 10 are barely displaced when the elliptic motion is excited in the contact portions 3a. On the other hand, the vibration displacement of displacement portions 1b (described in detail later) and displacement portions 1c (described in detail later) of the vibrator 10 from the reference position L is greater than the vibration displacement of the holding portions 1a. When the vibration displacement of the displacement portions 1b of the vibrator 10 and the vibration displacement of the displacement portions 1c from the reference position L are compared, the vibration displacement of the displacement portions 1c closer to the contact portions 3a is greater.

This is because as disclosed in Japanese Patent Application Laid-Open No. 2011-254587, the vibration displacement of the displacement portions 1c of the vibrator 10 is greater than that of the holding portions 1a, and vibrational energy can be stored in the displacement portions 1c. Therefore, concentration of the vibrational energy on the holding portions 1a can be avoided. This can reduce the vibration displacement of the holding portions 1a to prevent dissipation of the vibrational energy of the vibrator 10 from holding portions 11a (described in detail later) of a holding member 11 described later when the holding portions 1a are fixed to the holding member 11. Therefore, the size relationship of the vibration displacement from the reference position L between the holding portions 1a, the displacement portions 1b and the displacement portions 1c is as described above. Nodes of vibration can also be located at the positions of the holding portions 1a. This reduces the vibration displacement of the holding portions 1a. The holding portion 1a is equivalent to a holding portion of the present invention. The displacement portion 1b is equivalent to a first displacement portion of the present invention. The displacement portion 1c is equivalent to a second displacement portion of the present invention.

FIG. 4 illustrates a mechanism in which the AF lens 120 using the vibrator unit 121 as a driving source is driven in the optical axis OL direction. The vibrator 10 is held by the holding member 11 and pressurized by a pressurizing member 12 in a direction of the slider 4. The urging member 13, such as a compression spring, generates pressurizing force necessary for the pressurizing member 12 to pressurize the vibrator 10. A holding frame 14 holds the holding member 11 and is integrated with the AF lens 120 through a connection member 15. The vibrator unit 121 is formed by the vibrator 10, the holding member 11, the pressurizing member 12, the urging member 13 and the holding frame 14. The holding member 11 is equivalent to a holding means of the present invention.

One end of the urging member 13 is held by the pressurizing member 12, and the other end abuts the vibrator 10. The urging member 13 brings the vibrator 10 into contact with the slider 4 by pressure, in a direction indicated by an arrow A of FIG. 4. AC voltages with desired frequency and phase difference are applied to the piezoelectric element 2 of the vibrator 10 to drive the vibrator unit 121 in the X direction, that is, the direction of the optical axis OL. Positioning dowels 11d for positioning the vibrator 10 are provided on the holding member 11 as described later. A clearance C is a clearance between the positioning dowels 11d and the slider 4 in the Z direction. The clearance C denotes a clearance for preventing the positioning dowels 11d from coming in contact with the slider 4 when the contact portions 3a are displaced as illustrated in FIG. 2 or 3, for example. The AF lens 120 is integrated with the vibrator unit 121 through the connection member 15, and when the vibrator unit 121 is driven in the direction of the optical axis OL, the AF lens 120 is also integrally driven in the direction of the optical axis OL. The vibrator unit 121 is equivalent to a vibration wave motor of the present invention.

Figure 5:
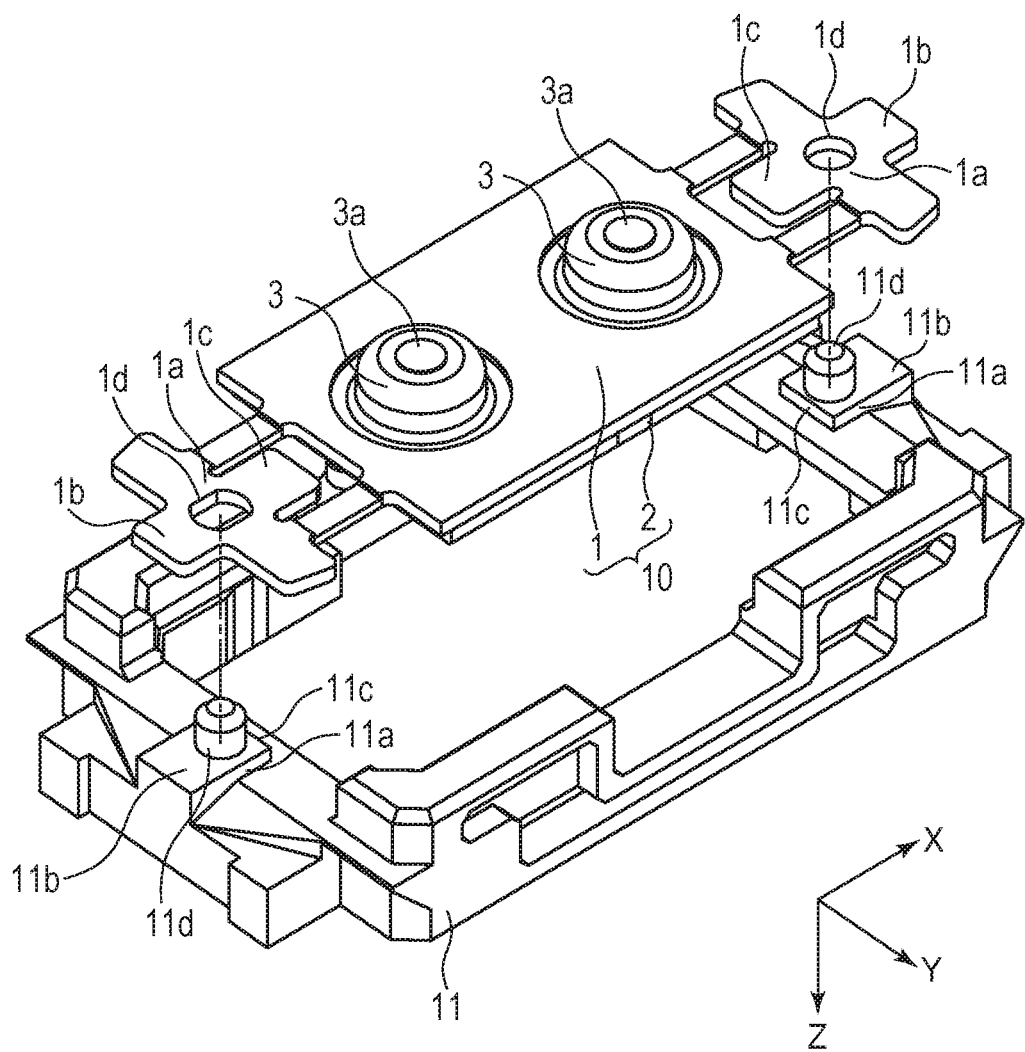
FIG. 5 is an exploded perspective view of the vibrator 10 and a holding member 11.

FIG. 5 illustrates an exploded perspective view of the vibrator 10 and the holding member 11. The elastic body 1 of the vibrator 10 is provided with the holding portions 1a, the displacement portions 1b and 1c extending in a direction (X direction of FIG. 5) connecting the holding portions 1a and the convex portions 3, and positioning holes 1d, in pairs on the left and right in the X direction. The holding portions 1a are held by the holding member 11, and the positioning holes 1d are fitted to the positioning dowels 11d of the holding member 11 described later. The holding member 11 is provided with the holding portions 11a for holding the vibrator 10, vibrator receiving portions 11b and 11c abutting the vibrator 10, and the positioning dowels 11d fitted to the positioning holes 1d of the vibrator 10, in pairs on the left and right in the X direction. The holding portion 11a is equivalent to a fixing portion of the present invention. The vibrator receiving portion 11b is equivalent to a first abutting portion of the present invention. The vibrator receiving portion 11c is equivalent to a second abutting portion of the present invention.

The positioning dowels 11d are fitted to the positioning holes 1d provided in pairs, and the vibrator receiving portions 11b and 11c abut the displacement portions 1b and 1c, respectively. Therefore, the vibrator 10 is positioned at predetermined positions in the X, Y and Z directions relative to the holding member 11. The positioning hole 1d is equivalent to a positioning hole of the present invention. The positioning dowel 11d is equivalent to a positioning portion of the present invention.

Figure 6A:
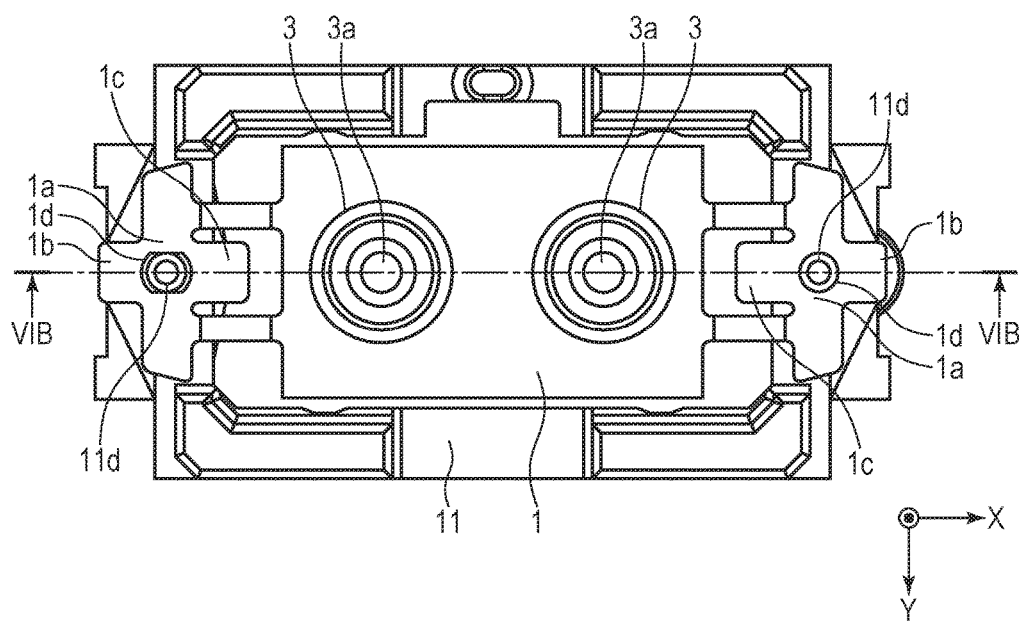
Figure 6B:
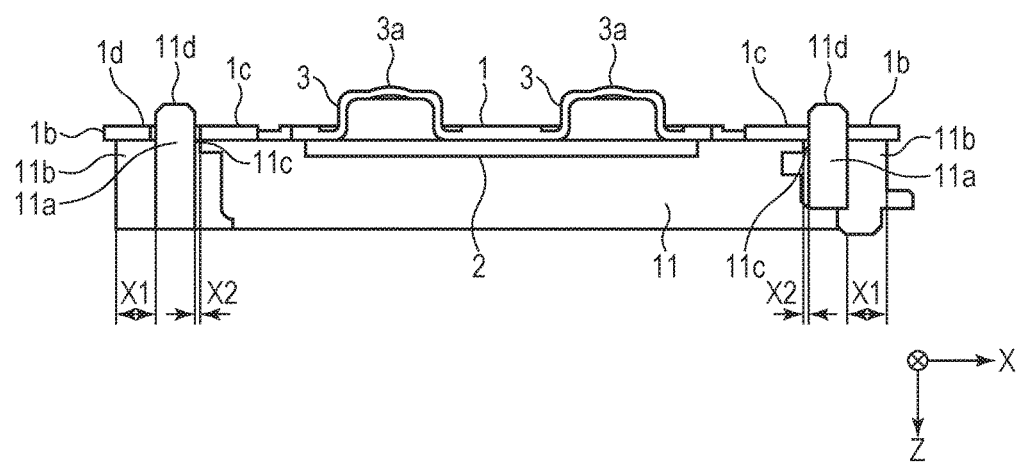
FIG. 6B is a cross-sectional view of a state in which the vibrator 10 and the holding member 11 in FIG. 6A are integrated.

FIG. 6A is a plan view of a state in which the vibrator 10 and the holding member 11 are integrated by adhesion or the like, and FIG. 6B illustrates a cross-sectional view of a cross-sectional line VIB-VIB in FIG. 6A. As illustrated in FIGS. 5 and 6B, when a range X1 that the vibrator receiving portions 11b abut the displacement portions 1b and a range X2 that the vibrator receiving portions 11c abut the displacement portions 1c are compared, X1 is greater than X2. As a result, an area that the displacement portion 1b abuts the holding member 11 is greater than an area that the displacement portion 1c abuts the holding member 11. The reason will be described below.

It is desirable that the elliptic motion excited in the contact portions 3a of the vibrator 10 is barely attenuated even when the vibrator 10 is fixed to the holding member 11. As illustrated in FIG. 3, when the elliptic motion is excited in the contact portions 3a, the vibration displacement of the displacement portions 1c of the vibrator 10 from the reference position L is greater than the vibration displacement of the displacement portions 1b of the vibrator 10 from the reference position L. Therefore, the vibration of the displacement portions 1c is reduced more with an increase in the abutting area of the displacement portions 1c and the vibrator receiving portions 11c. As a result, not only the elliptic motion of the contact portions 3a is reduced, but the displacement portions 1c stop vibrating. The vibration displacement of the vicinity of the holding portions 1a or the displacement portions 1b from the reference position L increases, and another vibration mode (hereinafter, called an unnecessary mode) is generated. The generation of the unnecessary mode inhibits the elliptic motion generated in the contact portions 3a or generates a defect, such as generation of abnormal noise caused by the unnecessary mode.

On the other hand, to prevent peeling of the adhesive due to the elliptic motion generated in the vibrator 10 when the vibrator 10 is fixed to the holding member 11 by adhesion for example, a larger abutting area of the vibrator 10 and the holding member 11 is better in order to increase the reliability of adhesion. Therefore, when the vibrator 10 and the holding member 11 are fixed by adhesion, the generation of the unnecessary mode needs to be prevented, and the peeling of the adhesive at the fixed parts (holding portions 1a and holding portions 11a) of the vibrator 10 and the holding member 11 needs to be prevented. In this regard, the vibrator 10 and the holding member 11 can be bonded at the holding portions 1a and the positioning holes 1d, at the holding portions 11a and the positioning dowels 11d, and at the displacement portions 1b and the vibrator receiving portions 11b.

As described, when the range X1 that the vibrator receiving portions 11b abut the displacement portions 1b and the range X2 that the vibrator receiving portions 11c abut the displacement portions 1c are compared, X1 is greater than X2. As a result, the area that the displacement portions 1b abut the holding member 11 is greater than the area that the displacement portions 1c abut the holding member 11, and the adhesion area of the vibrator 10 and the holding member 11 is also large. This can increase the reliability of adhesion without inhibiting the elliptic motion generated in the contact portions 3a.

As described, a vibration wave motor with a holding structure that does not inhibit the vibration of the entire vibrator can be provided by increasing the abutting area of the part with a small vibration displacement when the elliptic motion is excited in the contact portions 3a of the vibrator 10.

Although the case of applying the adhesive around the positioning dowels 11d to bond and fix the vibrator 10 and the holding member 11 is described as a method of fixing the vibrator 10 and the holding member 11, the present invention is not limited to this. The same effect can be obviously obtained when the displacement portions 1b and the vibrator receiving portions 11b abut, and the displacement portions 1c and the vibrator receiving portions 11c abut, after the holding portions 1a provided with the positioning holes 1d and the holding portions 11a provided with the positioning dowels 11d are fixed by welding or the like.

Figure 7:
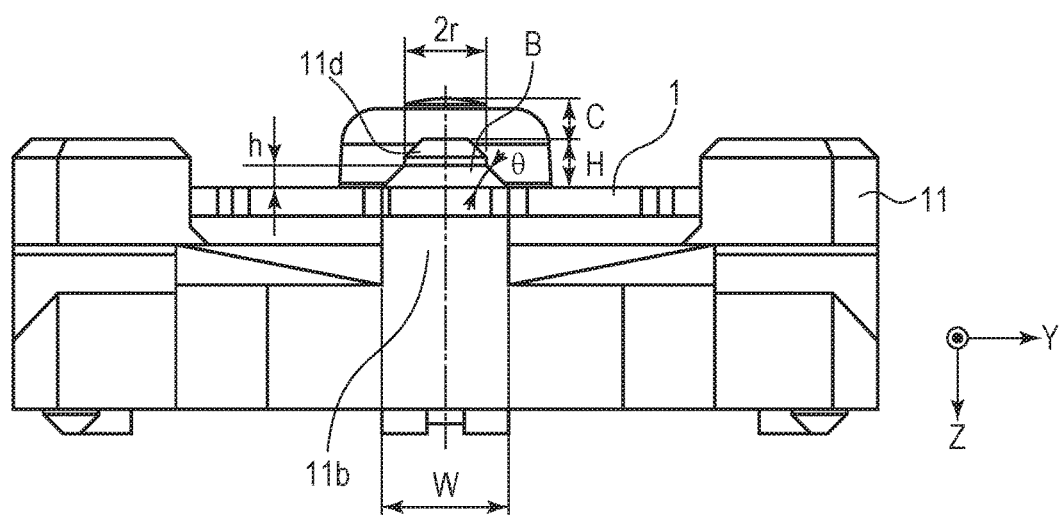

FIG. 7 illustrates a side view when the vibrator 10 and the holding member 11 are fixed by adhesion. When the adhesive is to be applied around the positioning dowels 11d to bond and fix the elastic body 1 and the holding member 11 of the vibrator 10, a relationship between a dimension of the vibrator receiving portions 11b in the Y direction (hereinafter, called a dimension in the width direction) and a height H of the positioning dowels 11d is taken into account. In FIG. 7, W is the dimension in the width direction of the vibrator receiving portions 11b of the holding member 11, 2r is a diameter dimension of the positioning dowels 11d, H is the height from the elastic body 1, θ is a contact angle of an adhesive B for bonding and fixing the vibrator 10 and the holding member 11 relative to the elastic body 1, and h is a height of the adhesive B from the elastic body 1.

As illustrated in FIG. 4, the height H of the positioning dowels 11d is not higher than the clearance C from the slider 4. The same applies to the height h of the adhesive B from the elastic body 1. The reason is as follows. At least one of the height H of the positioning dowels 11d and the height h of the adhesive B may become higher than the clearance C due to manufacturing errors of the components such as the holding member 11. In such a case, the positioning dowels 11d or the adhesive B comes in contact with the slider 4 to cause a malfunction of the vibrator unit 121 when the vibrator unit 121 is driven in the direction of the optical axis OL. Therefore, the height H of the positioning dowels 11d and the height h of the adhesive B cannot be designed to exceed the clearance C from the slider 4.

Therefore, the dimension (W) in the width direction of the vibrator receiving portions 11b of the holding member 11 and the diameter dimension (2r) of the positioning dowels 11d are determined such that the height h of the adhesive B satisfies the following relational expression (1).

$$H \geq h = \tan\theta \times (W/2 - r) \quad (1)$$

As a result, the height h of the adhesive B does not exceed the height H of the positioning dowels 11d, and the adhesive B does not spread beyond the dimension W in the width direction of the vibrator receiving portions 11b. Furthermore, the adhesive B does not reduce the vibration of the displacement portions 1c. Therefore, the elliptic motion of the contact portions 3a is not reduced, and the unnecessary mode is not generated when the elliptic motion is excited in the contact portions 3a of the vibrator 10. Since the material of the holding member 11 is plastic, the contact angle θ is generally smaller than 90 degrees, and relational expression (1) is not diverged.

As described, a vibration wave motor with a holding structure that does not inhibit the vibration of the entire vibrator can be provided by increasing the abutting area of the part with a small vibration displacement when the elliptic motion is excited in the contact portions 3a of the vibrator 10.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-109280, filed May 29, 2015, which is hereby incorporated by reference herein in its entirety.

What is claimed is:

1. A vibration wave motor comprising:
   a vibrator that generates an elliptic motion;
   a holding member that holds the vibrator; and
   a driven body driven by the vibrator, wherein
   the holding member comprises a first abutting portion and a second abutting portion abutting the vibrator,
   the vibrator comprises a first displacement portion at a part abutting the first abutting portion and comprises a second displacement portion at a part abutting the second abutting portion,
   a displacement of the first displacement portion is smaller than a displacement of the second displacement portion, and
   an area of the first abutting portion of the holding member is greater than an area of the second abutting portion.

2. The vibration wave motor according to claim 1, wherein
   a holding portion abutting the holding member is provided between the first displacement portion and the second displacement portion of the vibrator, and
   a fixing portion abutting the holding portion is provided between the first abutting portion and the second abutting portion.

3. The vibration wave motor according to claim 2, wherein
   a node of vibration is positioned at the holding portion when the vibrator generates the elliptic motion.

4. The vibration wave motor according to claim 2, wherein
   the holding portion is provided with a positioning hole for positioning the vibrator on the holding member.

5. The vibration wave motor according to claim 2, wherein
   the fixing portion is provided with a positioning portion for positioning the vibrator on the holding member.

6. The vibration wave motor according to claim 5, wherein
   the vibrator and the holding member are bonded and fixed by an adhesive applied around the positioning portion.

7. The vibration wave motor according to claim 5, wherein
   a height h of the adhesive from the vibrator satisfies the following relational expression, wherein W is a dimension in a width direction of the first abutting portion, 2r is a diameter dimension of the positioning portion, H is a height of the positioning portion from the vibrator, θ is a contact angle of the adhesive for bonding and fixing the vibrator and the holding member relative to the vibrator, and h is the height of the adhesive.

$$H \geq h = \tan\theta \times (W/2 - r)$$

8. The vibration wave motor according to claim 1, wherein
   the vibration wave motor is an ultrasonic motor in which the elliptic motion generates ultrasonic vibration.

9. An imaging apparatus comprising an AF lens using a vibration wave motor as a driving source, the vibration wave motor comprising:
   a vibrator that generates an elliptic motion;

a holding member that holds the vibrator; and
a driven body driven by the vibrator, wherein
the holding member comprises a first abutting portion and a second abutting portion abutting the vibrator,
the vibrator comprises a first displacement portion at a part abutting the first abutting portion and comprises a second displacement portion at a part abutting the second abutting portion,
a displacement of the first displacement portion is smaller than a displacement of the second displacement portion, and
an area of the first abutting portion of the holding member is greater than an area of the second abutting portion.

* * * * *